(12) United States Patent
Mecke et al.

(10) Patent No.: US 9,563,544 B2
(45) Date of Patent: Feb. 7, 2017

(54) FRAMEWORK FOR AUTOMATED TESTING OF MOBILE APPS

(75) Inventors: Christoph Mecke, Stutensee (DE); Armin Gienger, Karlsruhe (DE); Mirko Borkowski, Roemerberg (DE)

(73) Assignee: SAP SE, Walldorf (DE)

( * ) Notice: Subject to any disclaimer, the term of this patent is extended or adjusted under 35 U.S.C. 154(b) by 44 days.

(21) Appl. No.: 13/347,059

(22) Filed: Jan. 10, 2012

(65) Prior Publication Data
US 2013/0179858 A1 Jul. 11, 2013

(51) Int. Cl.
G06F 11/36 (2006.01)
(52) U.S. Cl.
CPC ....... *G06F 11/3688* (2013.01); *G06F 11/3684* (2013.01)
(58) Field of Classification Search
None
See application file for complete search history.

(56) References Cited

U.S. PATENT DOCUMENTS

| | | | |
|---|---|---|---|
| 2006/0073785 A1* | 4/2006 | Klassen et al. | 455/3.01 |
| 2007/0277154 A1 | 11/2007 | Badwe et al. | |
| 2012/0059919 A1* | 3/2012 | Glaser | G06F 11/3672 709/223 |
| 2012/0253745 A1* | 10/2012 | Dhanapal et al. | 702/186 |
| 2013/0007713 A1* | 1/2013 | Arcese | G06F 8/315 717/124 |

OTHER PUBLICATIONS

Song et al., "An Integrated Test Automation Framework for Testing on Heterogeneous Mobile Platforms" (2011), First ACIS International Symposium on Software and Network Engineering (SSNE), Seoul, 2011, pp. 141-145 [retrieved from http://ieeexplore.ieee.org/document/6150017/?arnumber=6150017].*
Sanderson, "Integration Testing Your asp.net MVC Application" (Jun. 11, 2009), pp. 1-11 [retrieved from http://blog.stevensanderson.com/2009/06/11/integration-testing-your-aspnet-mvc-application/].*
Sanderson, "First steps with Lightweight Test Automation Framework" (Mar. 27, 2009), pp. 1-13 [retrieved from http://blog.stevensanderson.com/2009/03/27/first-steps-with-lightweight-test-automation-framework/].*
Conway et al., "iPhone Programming: The Big Nerd Ranch Guide" (Aug. 2010), Big Nerd Ranch Inc., pp. 1-415.*
"European Application Serial No. 16176214.1, Search Report mailed Nov. 15, 2016", 13 pgs.
Duvall, Paul, Continuous Integration Improving Software Quality and Reducing Risk, (2007), 318.

* cited by examiner

*Primary Examiner* — Brian W Wathen
(74) *Attorney, Agent, or Firm* — Schwegman Lundberg & Woessner, P.A.

(57) ABSTRACT

A framework for the automated testing of mobile applications is disclosed. A mobile application to be operated on a mobile device is built based on a source code of the mobile application. The mobile application operates with a backend system. A test configuration for the mobile application and the backend system are defined. An automated test is performed with the test configuration on the mobile application on the mobile device and on the backend system. A log of test results is generated from the automated test performed on the mobile application and on the backend system.

19 Claims, 7 Drawing Sheets

FRAMEWORK FOR AUTOMATED TESTING OF MOBILE APPS

TECHNICAL FIELD

The present application relates generally to the field of testing mobile applications, and, in one specific example, to a framework for automated testing of mobile applications.

BACKGROUND

With the increasing usage of mobile devices, mobile applications (also referred to as apps) are now commonly used on mobile devices. These mobile applications allow the user of the mobile device to access information stored outside of the mobile device. In particular, some applications locally installed on the mobile device may also communicate with a remote server to access additional services, backend functions, and other applications from the remote server.

The testing of mobile applications that use services from remote servers requires different testing tools that focus on separate components. For example, a first testing tool may test whether the application runs correctly on the mobile device. A second testing tool may test whether the remote server responds correctly to the mobile device. Other testing tools may be needed to test different components that interface the mobile device and the remote server. As such, there currently is no solution for end to end testing of different scenarios including mobile applications as well as backend functions of remote servers.

BRIEF DESCRIPTION OF THE DRAWINGS

Some embodiments are illustrated by way of example and not limitation in the figures of the accompanying drawings in which.

DETAILED DESCRIPTION

Figure 1:
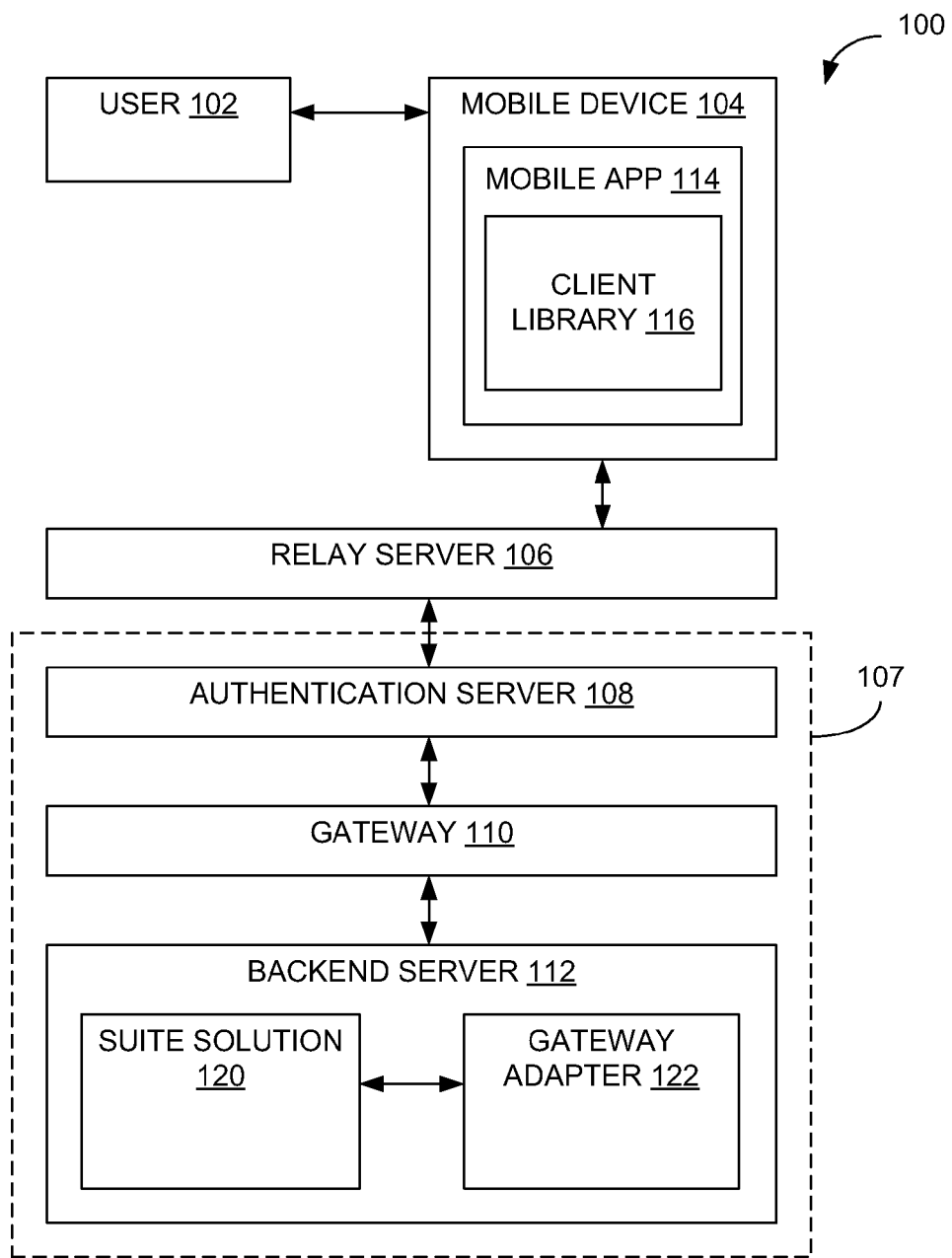
FIG. 1 is a block diagram depicting an example environment within which example embodiments may be deployed.

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive subject matter in unnecessary detail, well-known instruction instances, protocols, structures, and techniques have not been shown in detail. As used herein, the term "or" may be construed in an inclusive or exclusive sense. The term "user" may be construed to include a person or a machine. The term "interface" may be construed to include an application program interface (API) or a user interface. The term "database" may be construed to include a database or a NoSQL or non-relational data store (e.g., Google's BigTable or Amazon's Dynamo). The term "business object" may mean an object that represents an entity of a business inside a software application. For example, a business object may represent a person (e.g., an employee of a company) or a concept (e.g., a process within a company) inside an enterprise information management software application.

A framework for automated testing of mobile applications is disclosed. A mobile application to be operated on a mobile device is built based on a source code of the mobile application. The mobile application operates with a backend system. A test configuration for the mobile application and the backend system are defined. An automated test is performed with the test configuration on the mobile application on the mobile device and the backend system. A log of test results is generated from the automated test performed on the mobile application and on the backend system.

In one embodiment, the automated test has a number of tests from testing tools corresponding to the mobile device and components of the backend system. The source code of the mobile application corresponds to a test script stored in a content management system. The automated test comprises a number of test scripts corresponding to a number of test scenarios. The test configuration comprises, for example, a location of the test script, test data parameters, and test settings.

In one embodiment, the backend system has a frontend server and a backend server. The frontend server authenticates a user of the mobile application on the mobile device. The backend server provides an application corresponding to the mobile application.

In one embodiment, the backend server has an application server, a gateway adapter, and a gateway. The application server generates the application having a data protocol. The gateway adapter tailors a data model and a functionality of the application of the application server for the mobile application. The gateway interfaces the mobile application with the data protocol associated with the application.

In one embodiment, the test server generates a front end automated test and a back end automated test based the test configuration, a front end test script, and a back end test script. The test server then performs the front end automated test on the front end server and the back end automated test on the back end server. Result data are exchanged between the front end automated test and the back end automated test.

The present disclosure solves the lack of having an automated end to end testing of scenarios including mobile applications as well as backend functions and applications. Typically, automated testing system have limited specific coverage. For example, an integration test may test only certain aspects of the backend system. A unit test may test another aspect of the backend system. In another example, other tests may test some aspects of the front end system leaving out some other parts of the backend system. The present disclosure solves those shortcomings.

FIG. 1 is a block diagram depicting an example environment 100 within which example embodiments may be deployed. A user 102 operates a mobile application 114 (also referred to as a native app or app) on a mobile device 104. In one embodiment, the native apps uses their own respective Software Development Kits (SDK). The mobile application 114 uses a client library 116 that is provided for handling another data protocol (e.g., SAP Data Protocol, on-boarding, etc.).

In one embodiment, the mobile device 104 may include a mobile computing device such as a smart phone, a mobile computer, a tablet computer, and so forth. The mobile device 104 is capable of loading and running applications. The mobile device 104 is also capable of network communication with other computers.

The relay server 106 communicates with a corporate intranet 107. In one embodiment, the relay server 106 provides functionality similar to a reverse proxy. The corporate intranet 107 includes an authentication server 108, a gateway 110, and a backend server 112.

The authentication server 108, for example, provides functionality for user on-boarding, user authentication, distribution of X509 certificates, notifications via push, and the like. The gateway 110 may be used for the translation to a proprietary data protocol such as SAP Data protocol of SAP, Germany.

The backend server 112 includes, for example, an application (e.g, SAP Object Programming Suite System). In one embodiment, the backend server 112 includes a suite solution 120 and a gateway adapter 122. The suite solution 120 includes, for example, backend functionality of the application. The gateway adapter 122 exposes the data model and the functionality that are tailored to the needs of the specific mobile application.

Those of ordinary skill in the art will recognize that the testing architecture is not limited to the present mobile application platforms as illustrated in the present description. The present concept is also applicable to other types of mobile application platforms and other types of backend systems.

Figure 2A:
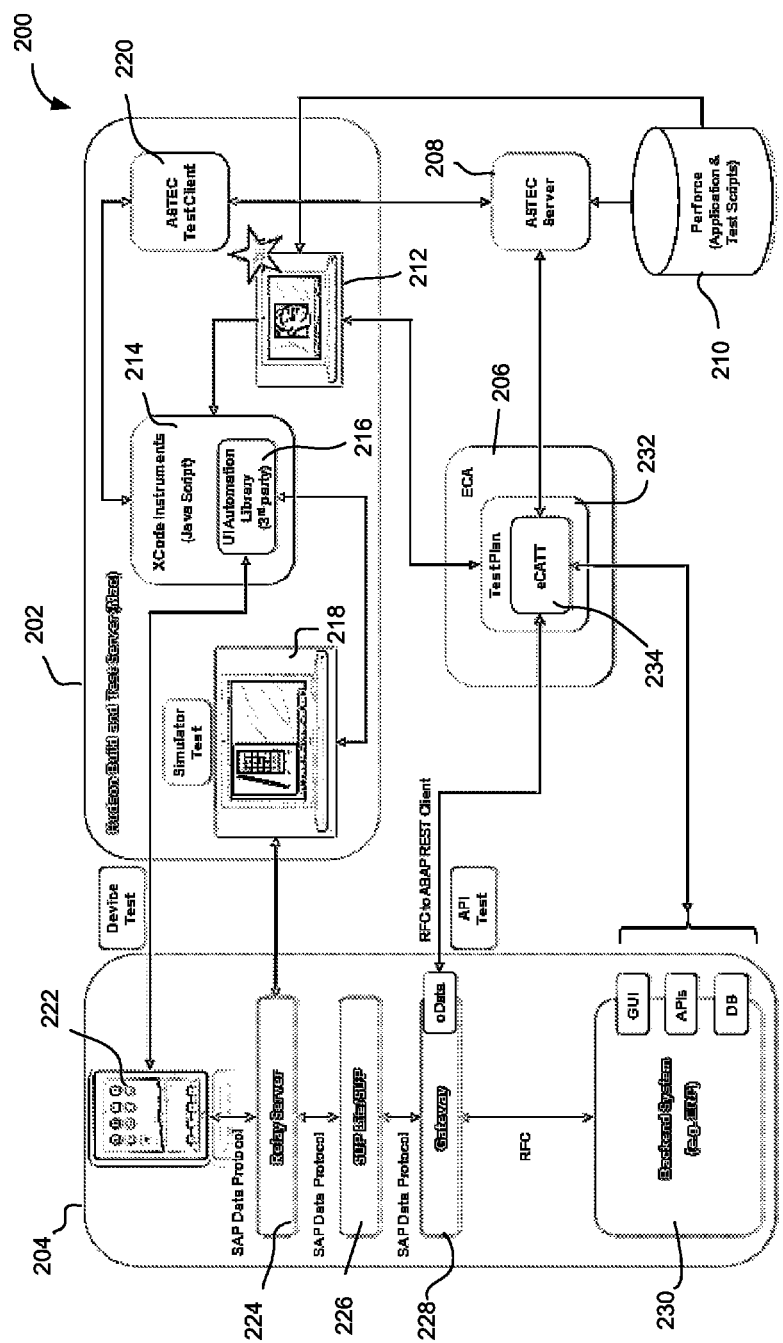
FIG. 2A is a block diagram depicting an example embodiment of a mobile test automation architecture.

FIG. 2A is a block diagram depicting an example embodiment of a mobile test automation architecture 200. Automated tests may test a whole stack used by mobile apps. FIG. 2A illustrates an example of a Business Suite organization. Those of ordinary skill in the art will recognize that other types of architectures may also be applicable. The architecture of mobile applications may be different and adjusted according to the types of applications being accessed from the mobile device.

The mobile test automation architecture 200 includes a build and test server 202, a delivery architecture 204, a test configuration server 206, a storage server 208, and a storage device 210.

The build and test server 202, the delivery architecture 204, the test configuration server 206, the storage server 208, and the storage device 210 may be coupled to each other via a network (not shown). The network enables communication between systems. Accordingly, the network may be a mobile telephone network, a Plain Old Telephone (POTS) network, a wired network, a wireless network (e.g., a WiFi or WiMax network), or any suitable combination thereof. The communication may be based on any communication protocols. Examples of communication protocols include Transmission Control Protocol/Internet Protocol (TCP/IP), HyperText Transfer Protocol (HTTP), File Transfer Protocol (FTP), Simple Mail Transfer Protocol (SMTP), Post Office Protocol (POP), Internet Message Access Protocol (IMAP), Wireless Access Protocol (WAP), Gopher, wireless Internet protocols, and instant messaging protocols. The network may be implemented using the Internet, a wide area network (WAN), a local area network (LAN), or any suitable combination thereof.

The build and test server 202 is configured to provide a framework for an automated end to end testing of scenarios. In one embodiment, the build and test server 202 includes an Xcode instruments module 214, a testing client 212, a simulator 218, and an ASTEC test client 220. The Xcode instrument module 214 may operate using JavaScript and may include a UI automation library 216 provided by a third party. In one embodiment, the testing client 212 may utilize continuous integration (e.g., Hudson) to apply quality control in small pieces that are applied frequently instead of applying quality control after completing all development.

The testing client 212 obtains testing configurations (e.g., test plan 232 and eCATT 234 "extended Computer Aid Testing Tool") associated with a mobile application from test configuration server 206. Standard features associated with the test client 212 may include the ability to schedule and management when (scheduling) and how (management of several tests including aggregation of results) the tests are performed on the front end and the back end. Test result data are exchanged between the front end automated test and the back end automated test. Both tests are connected by exchanging data and run in a well defined order within the overall test scenario. In one embodiment, several tests on both sides (front end and back end) could run alternating on frontend and backend.

Test configuration server 206 communicates with storage server 208 which retrieves applications and test scripts from storage device 210. The applications and test scripts are loaded in the testing client 212. In one embodiment, ASTEC Test Client 220 communicates with storage server 208 to retrieve the applications and test scripts from storage device 210.

The delivery architecture 204 includes a mobile device 222 communicating using a proprietary data protocol (e.g., SAP Data Protocol) with relay server 224, authentication server 226, gateway 228, and back end system 230. As previously described, the authentication server 226 provides functionality for user on-boarding, user authentication, distribution of X509 certificates, notifications via push, and the like. The gateway 228 may be used for the translation to the SAP Data protocol.

The backend system 230 includes, for example, an application (e.g., SAP Object Programming Suite System). For example, the application may allow manipulating or displaying a visual representation of an instance of a business object. The visual representation of the business object may include a visual representation of one or more data items of the business object. A data item of the business object may be a unit of data corresponding to the business object that is managed by an application that provides the business object. The visual representation of the business object may include a diagram of the relationships between the business object and the one or more data items of the business object. The visual representation of the business object may also include a diagram of the relationships between the one or more data items of the business object.

As such, the testing client 212 is capable of orchestrating the entire testing process from end to end (front end to back end) by communicating with various components configured to test corresponding modules. For example, the testing client 212 communicates with Xcode instruments module 214 to perform a device test on mobile device 222. In one embodiment, the simulator 218 communicates with relay server 224. Furthermore, the testing client 212 communicates with test plan 232 to perform an API test with gateway 228. The testing client 212 communicates with eCATT 234 to perform a test on the back end system 230 based on the application of Xcode instruments module 214.

Therefore, the test automation framework is able to drive and verify this stack at various points. The following points of interaction are possible:

Mobile App (platform dependent)
Data service calls
ABAP Backend

One advantage in the design of the present test automation framework system is the use of standard components wherever possible, which allows for an easy exchange of test components (usually the test automation tool for UI testing of various platforms).

In detail, the integrated test automation framework performs the following steps, all controlled by a Continuous Integration (e.g, Hudson) and Test server 202 installed on a central testing client 212:

Sync sources (application and test scripts) from the storage device 210 (e.g. Perforce)
    Build the App (Xcode Instruments module 214 provides a JavaScript library with APIs that simulate user interactions on the mobile device 222 using the simulator 218)
    Prepare the Test Case via UI Automation Library 216
    Set up test execution environment
    Execute the automated tests via appropriate test automation tools (e.g., eCATT 234, Xcode Instruments module 214)
    Write a log and send result In order to use the test automation framework, several configurations may be done before (e.g., the framework needs to know the right perforce path, the name of the script, test data parameters and other settings). All those configuration parameters are stored in the excel config.xls, from where the framework generates the right settings when the setup phase in Hudson is started.

With respect to the Xcode Instruments module 214, in order to achieve reusable and flexible scripts, it is a good practice in test automation to separate the actual test coding test data (e.g., expected values which need to be checked) coding for App settings, like logon-data so scripts can be run against a different backend system or SUP with different data. Unfortunately, this separation is not easy with JavaScript as parameters that are stored externally cannot be imported into the script. The next sections illustrate how the separation of test data and settings coding is implemented via the include mechanism in JavaScript.

The creation of JavaScript for UI automation in instruments consists of two phases:
1. Create the base JavaScript by using the "capture" function in Instruments "Automation" template
2. Create the productive script by refining the recorded script with checks, reuse functions, and test data.

The challenge in an end to end automated test for mobile apps is to integrate different test tools into one common framework. Such an integrated test consists of several steps where some are executed on the mobile device or simulator (run via instruments tool), and some are run in one or more backend systems run by eCATT or another automation tool than can be started from eCATT. In order to achieve this, a TAPS solution from SAP BOBJ may be used. TAPS is based on integration of eCATT infrastructure with ASTEC, the test automation engine of SAP BOBJ.

With respect to storage server 208, the ASTEC automation engine is based on "tasks" which describe the test client 220 (i.e. mobile test client) and the steps that need to be executed on the test client (called work units). Work units may be plug-ins that perform certain actions on the test client 220, such as starting the automation toll, returning results, and the like. Whenever a task is launched from the storage server 208, a complete reinstallation of the ASTEC client software is done and the work units are started. It is possible to exchange parameters between work units.

TAPS integrates the ASTEC server to drive the test automation tool on the mobile frontend with eCATT and SAP's test workbench. Here, eCATT plays the leading part: an eCATT script is used to drive the backend tests as well the tasks on the ASTEC server and, hence, the frontend tests. eCATT makes use of the Webservice interface of ASTEC to start the task and to check the status of the task. Since Webservice can be launched asynchronously at the start task, another Webservice may be used to check the status. The eCATT repeatedly waits and checks the status until the Webservice returns the information that the task has either successfully finished or aborted. For the backend tests, other eCATT scripts are used. Finally, all eCATT scripts are integrated into one main script calling the backend as well as the ASTEC scripts via a REF command.

For mobile test automation, one task is used that defines:
    the automation test client (MAC),
    a work unit that starts the test automation tool (Instruments) from the command line and,
    another work unit that exports the result log.

By defining a test configuration for this main script, the test scenario can be integrated into SAP's test workbench (i.e. tests can be included into test plans and packages).

Figure 2B:
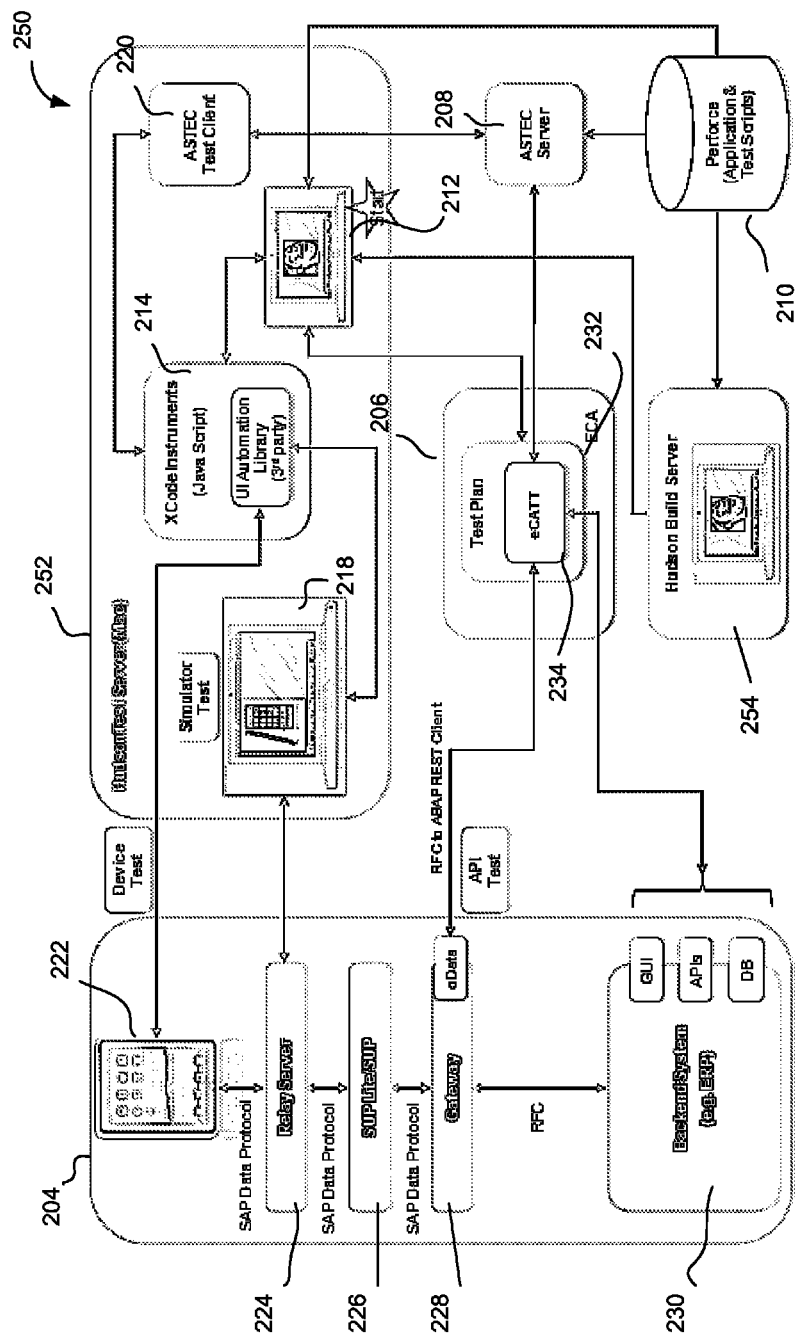
FIG. 2B is a block diagram depicting another example embodiment of a mobile test automation architecture.

FIG. 2B is a block diagram depicting another example embodiment of a mobile test automation architecture 250. In contrast to FIG. 2A, Hudson Build Server 254 may be located separately from Hudson Test Server 252. The remaining parts numbers on FIG. 2B are the same as FIG. 2A.

Figure 3:
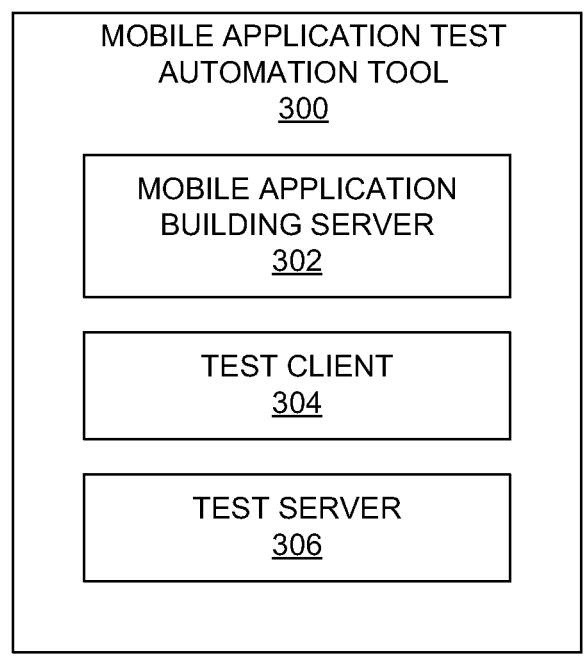
FIG. 3 is a block diagram depicting an example embodiment of a mobile test automation tool.

FIG. 3 is a block diagram depicting an example embodiment of a mobile application test automation tool 300. The mobile application test automation tool 300 includes a mobile application building server 302, a test client 304, and a test server 306.

The mobile application building server 302 builds a mobile application to be operated on a mobile device based on a source code of the mobile application. The mobile application is configured to operate with a backend system.

The test client 304 defines a test configuration for the mobile application and the backend system.

The test server 306 performs an automated test with the test configuration on the mobile application on the mobile device and the backend system. The test server 306 also generates a log of test results from the automated test performed on the mobile application and the backend system.

In one embodiment, the automated test performed by test server 306 comprises several tests from different testing tools corresponding to the mobile device and components of the backend system. For example, the automated test may include test scripts corresponding to test scenarios.

The source code of the mobile application may correspond to a test script stored in a content management system. As previously described, the test configuration may include a location of the test script, test data parameters, and test settings.

In one embodiment, the backend system includes a frontend server and a backend server. The frontend server authenticates a user of the mobile application on the mobile device. The backend server provides an application corresponding to the mobile application.

In one embodiment, the backend server includes an application server, a gateway adapter, and a gateway. The application server generates the application having a data protocol (SAP Data Protocol). The gateway adapter tailors a data model and a functionality of the application of the application server for the mobile application. The gateway interfaces the mobile application with the data protocol associated with the application.

In one embodiment, the test server 306 generates a front end automated test based on the test configuration and a front end test script. The test server 306 also generates a back end automated test based on the test configuration and a back end test script, performs the front end automated test on the frontend server, and performs the back end automated test on the backend server.

Figure 4:
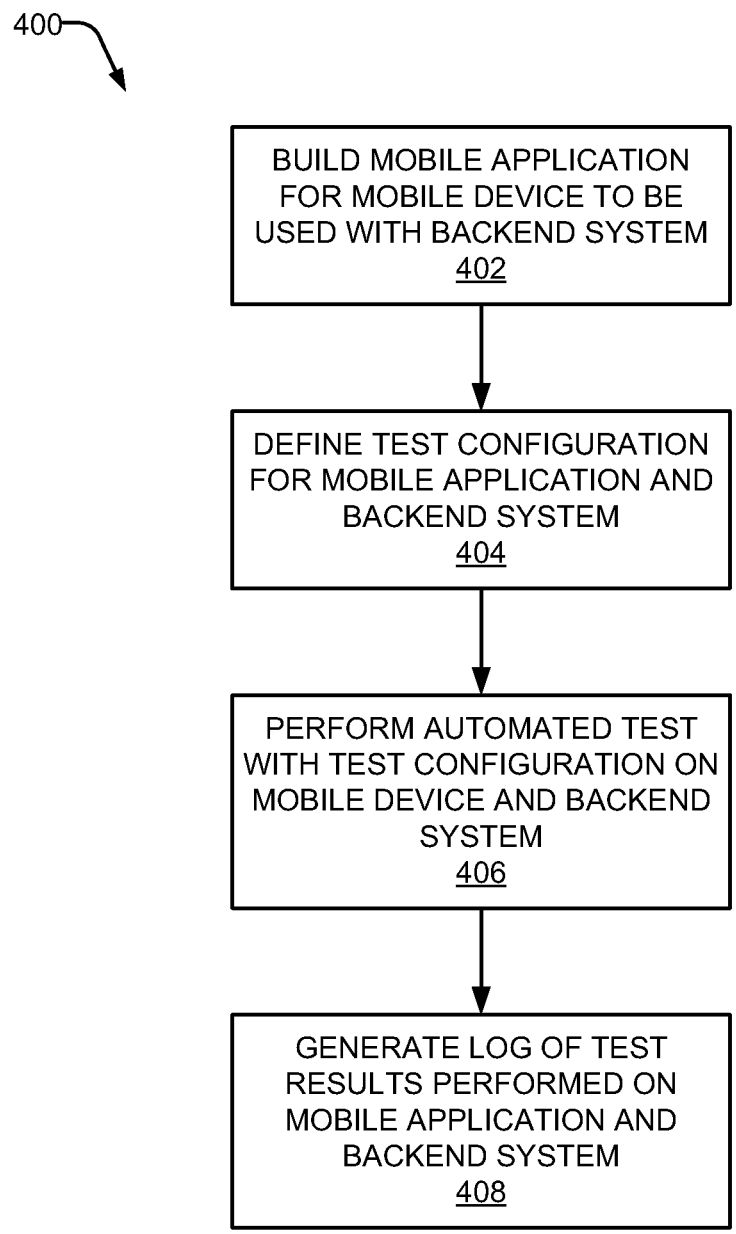
FIG. 4 is a flowchart depicting an example embodiment of a method for operating a mobile test automation tool.

FIG. 4 is a flowchart depicting an example embodiment of a method 400 for operating a mobile test automation tool. At operation 402, a mobile application is built to be operated on a mobile device or simulated on the mobile device based on a source code of the mobile application. The mobile application may be configured to operate with a backend system. In one embodiment, the mobile application building server 302 of FIG. 3 performs operation 402.

At operation 404, a test configuration is defined for the mobile application and the backend system. In one embodiment, the test client 304 of FIG. 3 performs operation 404.

At operation 406, an automated test with the test configuration is performed on the mobile application on the mobile device and the backend system. In one embodiment, the test server 306 of FIG. 3 performs operation 406 and may generate a log of test results from the automated test at operation 408.

Figure 5:
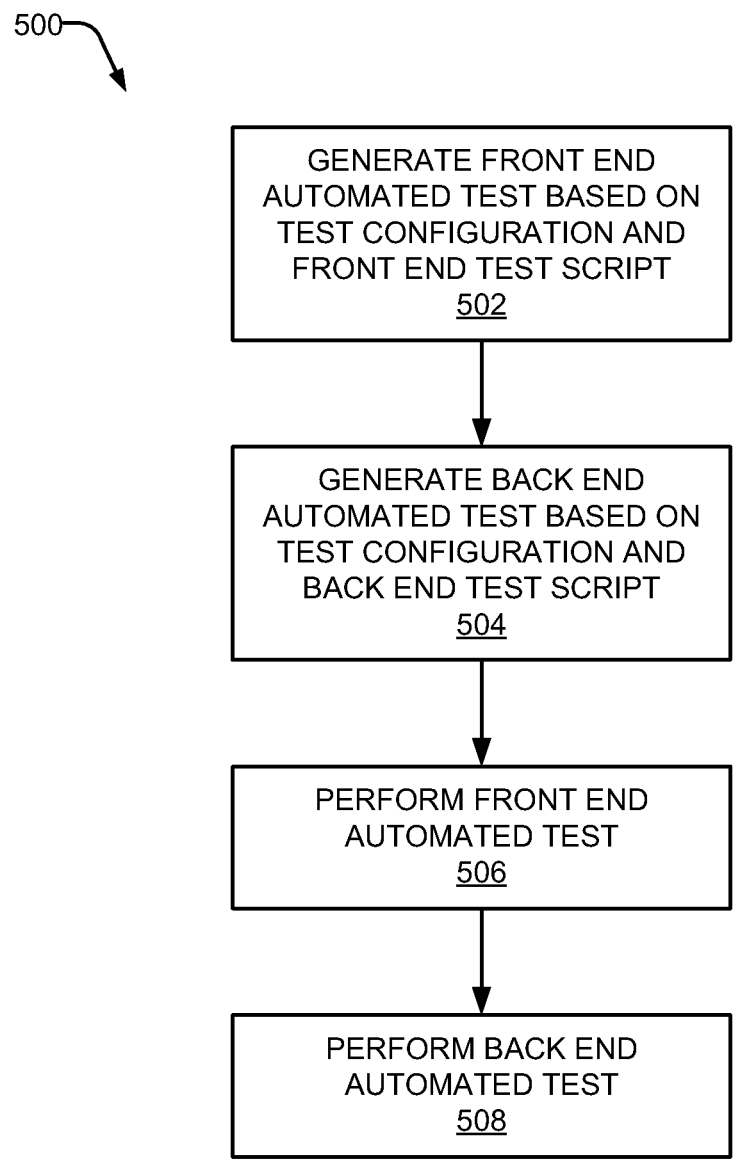
FIG. 5 is a flowchart depicting another example embodiment of a method for operating a mobile test automation tool.

FIG. 5 is a flowchart depicting another example embodiment of a method 500 for operating a mobile test automation tool. At operation 502, a front end automated test is generated based the test configuration and a front end test script. In one embodiment, the test client 220 performs the operation 502.

At operation 504, a back end automated test is generated based on the test configuration and a back end test script. In one embodiment, the ECA (Extended Computer Aid) server 206 performs the operation 504.

At operation 506, the front end automated test is performed on the frontend server. In one embodiment, the test client 220 performs the operation 506.

At operation 508, the back end automated test is performed on the backend server. In one embodiment, the ECA server 206 performs the operation 508.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 120) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
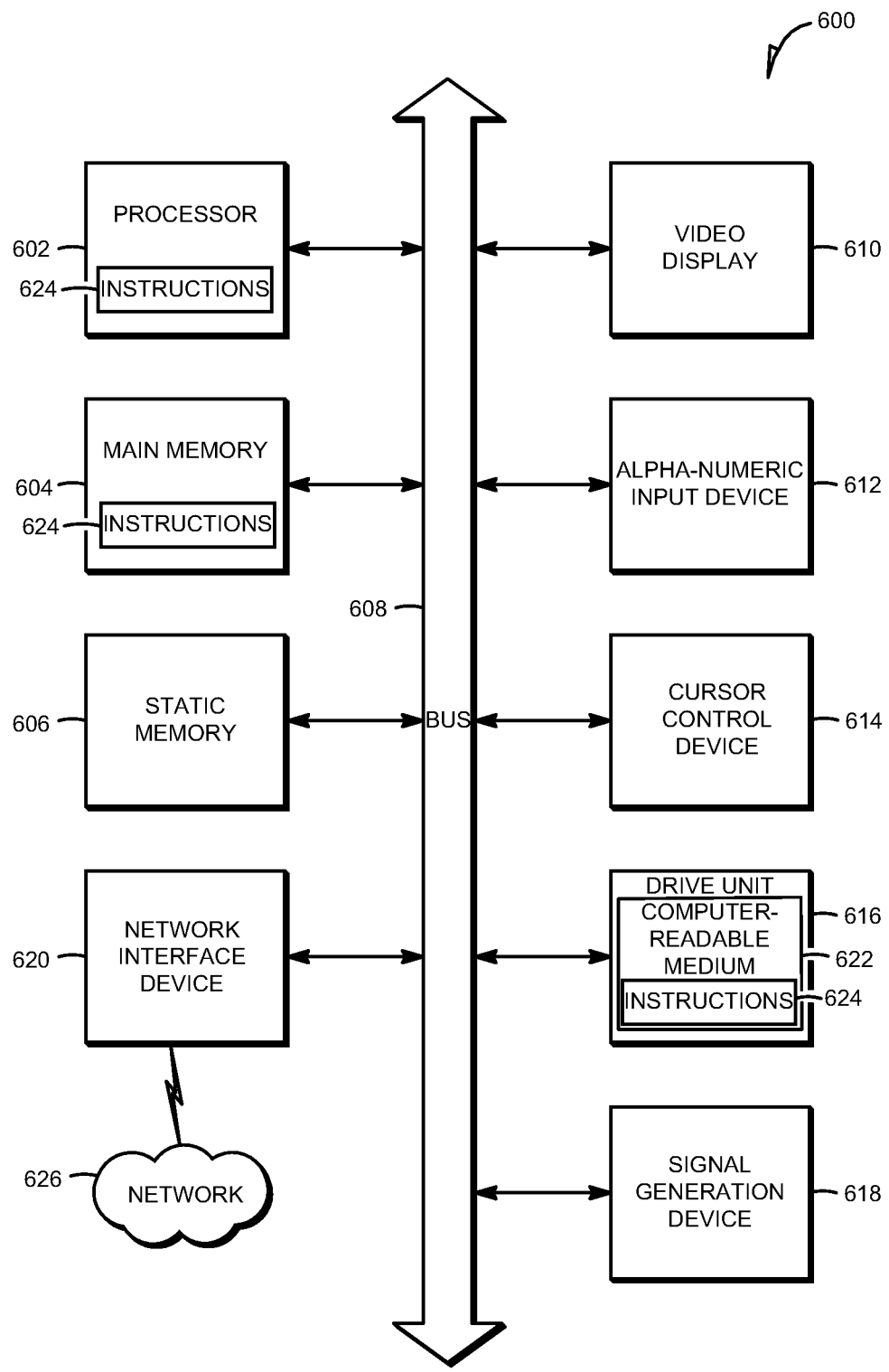
FIG. 6 is a block diagram of an example computer system on which methodologies described herein may be executed.

FIG. 6 is a block diagram of machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   building a mobile application at a mobile application building server based on a source code of the mobile application, the mobile application configured to be operated on a mobile device and to operate with a backend system comprising an authentication server configured to authenticate a user of the mobile application on the mobile device and a backend server configured to provide a functionality to the mobile application via an application of the backend server;
   generating a frontend script to test, on a test server, front end functionalities of the mobile application on the mobile device by checking values generated by execution of the frontend script against expected values;
   generating a backend script to test backend functionalities of the backend system by checking values generated by execution of the backend script against expected values;
   defining a test configuration for the mobile application and for the backend system;
   integrating, based on the configuration, the frontend script with the backend script into an automated test, including a front end automated test and a back end automated test, configured to perform end to end testing on the mobile application and the backend system;
   performing the front end automated test, on the mobile application, with the test configuration at the test server to generate front end functionalities test results of the mobile application;
   providing at least a portion of the generated front end functionalities test results to the back end automated test; and
   after receiving the provided front end functionalities test results, performing the back end automated test on the backend system to generate backend functionalities test results of the backend system, the back end automated test comprising an authentication server functionalities test and a backend server functionalities test.

2. The computer-implemented method of claim 1, wherein the automated test comprises a plurality of tests from testing tools corresponding to tests to be performed on the mobile application to be operated on the mobile device and components of the backend system.

3. The computer-implemented method of claim 1, wherein the source code of the mobile application corresponds to a test script stored in a content management system.

4. The computer-implemented method of claim 1, wherein the automated test comprises a plurality of test scripts corresponding to a plurality of test scenarios.

5. The computer-implemented method of claim 1, wherein the test configuration comprises a location of the test script, test data parameters, and test settings.

6. The computer-implemented method of claim 1, further comprising generating a log of test results from the performance of the automated test, the log of test results comprising the front end functionalities test results and the backend functionalities test results.

7. The computer-implemented method of claim 6, wherein the backend server further comprises:
   an application server configured to generate the application of the backend server having a data protocol;
   a gateway adapter configured to tailor a data model and a functionality of the application of the backend server for the mobile application; and
   a gateway configured to interface the mobile application with the data protocol associated with the application of the backend server.

8. The method of claim 1, wherein the test configuration is configured to test a stack used by the mobile application.

9. The method of claim 1, wherein the test configuration is configured to provide end to end testing of various testing scenarios of pieces of the mobile application during development.

10. A system comprising:
    a mobile application building server configured to:
       build a mobile application at a mobile application building server based on a source code of the mobile application, the mobile application configured to be operated on a mobile device and to operate with a backend system comprising an authentication server configured to authenticate a user of the mobile application on the mobile device and a backend server configured to provide a functionality to the mobile application via an application of the backend server;
       define a test configuration for the mobile application and for the backend system;
       generate a frontend script to test, on a test server, front end functionalities of the mobile application on the mobile device by checking values generated by execution of the frontend script against expected values;

generate a backend script to test backend functionalities of the backend system by checking values generated by execution of the backend script against expected values;

an integration server configured to integrate, based on the configuration, the frontend script with the backend script into an automated test, including a front end automated test and a back end automated test, configured to perform end to end testing on the mobile application and the backend system; and a test server configured to:
perform the front end automated test, on the mobile application, with the test configuration at the test server to generate front end functionalities test results of the mobile application;
provide at least a portion of the front end functionalities test results to the back end automated test; and
after receiving the provided front end functionalities test results, perform the back end automated test on the backend system to generate backend functionalities test results of the backend system, the back end automated test comprising an authentication server functionalities test and a backend server functionalities test.

11. The system of claim 10, wherein the automated test comprises a plurality of tests from testing tools corresponding to tests to be performed on the mobile application to be operated on the mobile device and components of the backend system.

12. The system of claim 10, wherein the source code of the mobile application corresponds to a test script stored in a content management system.

13. The system of claim 10, wherein the automated test comprises a plurality of test scripts corresponding to a plurality of test scenarios.

14. The system of claim 10, wherein the test configuration comprises a location of the test script, test data parameters, and test settings.

15. The system of claim 10, wherein the automated test is further configured to generate a log of test results from the automated test, the log of test results comprising the front end functionalities test results and the backend functionalities test results.

16. The system of claim 15, wherein the backend server further comprises:
an application server configured to generate the application of the backend server having a data protocol;
a gateway adapter configured to tailor a data model and a functionality of the application of the backend server for the mobile application; and
a gateway configured to interface the mobile application with the data protocol associated with the application of the backend server.

17. A non-transitory machine-readable storage medium storing instructions which, when executed by at least one processor, performs operations comprising:

building a mobile application at a mobile application building server based on a source code of the mobile application, the mobile application configured to be operated on a mobile device and to operate with a backend system comprising an authentication server configured to authenticate a user of the mobile application on the mobile device and a backend server configured to provide a functionality to the mobile application via an application of the backend server;

generating a frontend script to test, on a test server, front end functionalities of the mobile application on the mobile device by checking values generated by execution of the frontend script against expected values;

generating a backend script to test backend functionalities of the backend system by checking values generated by execution of the backend script against expected values;

defining a test configuration for the mobile application and for the backend system;

integrating, based on the configuration, the frontend script with the backend script into an automated test, including a front end automated test and a back end automated test, configured to perform end to end testing on the mobile application and the backend system;

performing the front end automated test, on the mobile application, with the test configuration at the test server to generate front end functionalities test results of the mobile application;

providing at least a portion of the generated front end functionalities test results to the back end automated test; and after receiving the provided front end functionalities test results, performing the back end automated test on the backend system to generate backend functionalities test results of the backend system, the back end automated test comprising an authentication server functionalities test and a backend server functionalities test.

18. The non-transitory machine-readable storage medium of claim 17, further comprising generating a log of test results from the automated test, the log of test results comprising the front end functionalities test results and the backend functionalities test results.

19. The non-transitory machine-readable storage medium of claim 18, wherein the backend server further comprises:
an application server configured to generate the application of the backend server having a data protocol;
a gateway adapter configured to tailor a data model and a functionality of the application of the backend server for the mobile application; and
a gateway configured to interface the mobile application with the data protocol associated with the application of the backend server.

* * * * *